(12) United States Patent
Forsyth

(10) Patent No.: US 8,539,206 B2
(45) Date of Patent: Sep. 17, 2013

(54) METHOD AND APPARATUS FOR UNIVERSAL LOGICAL OPERATIONS UTILIZING VALUE INDEXING

(75) Inventor: Andrew T. Forsyth, Kirkland, WA (US)

(73) Assignee: Intel Corporation, Santa Clara, CA (US)

( * ) Notice: Subject to any disclaimer, the term of this patent is extended or adjusted under 35 U.S.C. 154(b) by 418 days.

(21) Appl. No.: 12/890,571

(22) Filed: Sep. 24, 2010

(65) Prior Publication Data

US 2012/0079244 A1    Mar. 29, 2012

(51) Int. Cl.
*G06F 9/305* (2006.01)
(52) U.S. Cl.
USPC .......................................... 712/223
(58) Field of Classification Search
USPC .......................................... 712/223
See application file for complete search history.

(56) References Cited

U.S. PATENT DOCUMENTS

| | | | |
|---|---|---|---|
| 4,237,532 A * | 12/1980 | Borgerson et al. | 712/236 |
| 5,500,947 A * | 3/1996 | Uhler et al. | 712/211 |
| 5,881,307 A | 3/1999 | Park et al. | |
| 6,721,866 B2 | 4/2004 | Roussel et al. | |
| 7,014,122 B2 * | 3/2006 | Datta et al. | 235/494 |
| 7,464,255 B1 | 12/2008 | Tan et al. | |
| 7,941,641 B1 | 5/2011 | Jung | |
| 2008/0100628 A1 * | 5/2008 | Mejdrich et al. | 345/502 |
| 2010/0275192 A1 * | 10/2010 | Serebryany | 717/151 |

OTHER PUBLICATIONS

Diefendorff et al. (Diefendorff) (AltiVec Extension to PowerPC Accelerates Media Processing); IEEE Micro; vol. 20 Issue 2, Mar. 2000; p. 85-96.*
Wikipedia, "Truth Table" [downloaded from the internet Jan. 13, 2011], 9 pages http://en.wikipedia.org/wiki/Truth_table.
International Search Report, application No. PCT/US2011/052913, filed Sep. 23, 2011.

* cited by examiner

*Primary Examiner* — Keith Vicary
(74) *Attorney, Agent, or Firm* — Blakely, Sokoloff, Taylor & Zafman LLP

(57) ABSTRACT

An apparatus and method are described for performing arbitrary logical operations specified by a table. For example, one embodiment of a method for performing a logical operation on a computer processor comprises: reading data from each of two or more source operands; combining the data read from the source operands to generate an index value, the index value identifying a subset of bits within an immediate value transmitted with an instruction; reading the bits from the immediate value; and storing the bits read from the immediate value within a destination register to generate a result of the instruction.

27 Claims, 6 Drawing Sheets

METHOD AND APPARATUS FOR UNIVERSAL LOGICAL OPERATIONS UTILIZING VALUE INDEXING

BACKGROUND

1. Field of the Invention

This invention relates generally to the field of computer processors. More particularly, the invention relates to an apparatus and method supporting universal logical operations on a computer processor.

2. Description of the Related Art

Computer processors execute instructions to perform mathematical operations and logical operations. Mathematical operations include, for example, floating point and integer addition, subtraction, multiplication, and division, with different levels of precision. Logical operations include functions such as AND, OR, NAND, NOR, XOR, shift left/right, swizzle, selection, and voting, to name just a few.

In certain circumstances (particularly when three or more operands are involved), relatively simply logical operations may require the execution of a significant number of instructions. By way of example, logic such as dest=(src1 AND dest) OR (src2 AND (NOT dest)) is required to specify that if a particular bit in the destination register (dest) is set, source register 1 (src1) should be selected, otherwise source register 2 (src2) should be selected. Executing this operation using conventional techniques requires executing multiple different instructions (two AND operations, one OR operation and one NOT operation). A variety of other relatively simple functions must be implemented with multiple sequences of instructions using conventional techniques.

Accordingly, new techniques for executing logical operations which require the execution of fewer instructions would be beneficial.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

An "immediate value" is a binary value associated with an instruction (e.g., explicitly included as part of the instruction or combined with the instruction). One well known immediate value associated with the x86 instruction set is an 8-bit immediate labeled imm8. The immediate value for an instruction is generated with the instruction at compile time. While the embodiments of the invention described below use imm8 or imm16 immediate values, the underlying principles of the invention are not limited to any particular type of immediate value. In fact, the underlying principles of the invention may be implemented using any type of binary code associated with an instruction.

In one embodiment of the invention, different immediate values are used to identify different logical operations (e.g., AND, NAND, XOR, invert, select, vote, etc). In this embodiment, certain bits from the source operands of an instruction are combined to form an index value which identifies bit positions within the immediate value of the instruction. The bits read from the identified bit positions are then combined in a destination register to arrive at a result of the logical operation. Said another way, the immediate value is used as a lookup table to arrive at the result for each logical operation.

Figure 1:
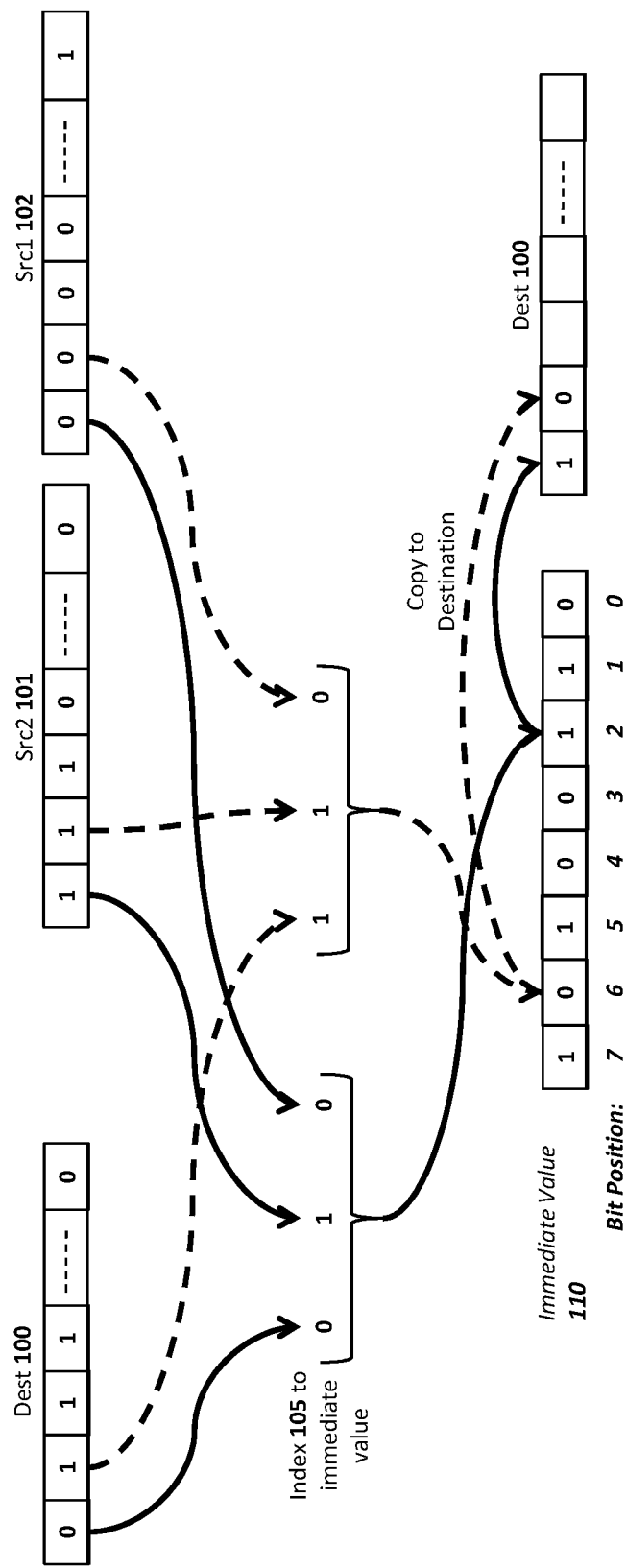
FIG. 1 illustrates one embodiment of the invention in which indices to an immediate value are generated from three source operands.

FIG. 1 illustrates one particular example in which bits are read from three operands stored in source register 1 (src1) 102, source register 2 (src2) 101, and destination register (dest) 100 to form an index 105 identifying a bit position within the immediate value 110. The binary values at the identified bit positions are then copied into the destination register 100. While this particular register arrangement is used for the purposes of illustration, the underlying principles of the invention are not limited to any particular set of registers. For example, rather than using a "destination" register to store a source operand, a third dedicated source register may be used (e.g., "source register 3").

In the specific example shown in FIG. 1, bits from the first bit positions of the destination register 100 and source registers 101 and 102 are initially read to form index 010 as shown (as indicated by the solid arrows). In one embodiment, the index is formed from a bitwise concatenation of the three source values. The index 010 identifies bit position 2 of the immediate value 110 (i.e., binary value 010 is equal to 2). The bit from bit position 2 is then read from the immediate value (a binary 1 in the illustrated example) and stored in the destination register at the first bit position, as shown. The same process is implemented for each of the bits of each of the source operands until all of the bits have been read and indexed bit values have been copied from the immediate value to the destination register. For example, as shown in FIG. 1, an index value of 110 is generated using bits from the second bit positions of the destination and source registers and this index value is used to index the immediate value at bit position 6 (i.e., binary value 110 is equal to 6). The bit from bit position 6 is then read from the immediate value (a binary 0) and stored in the second bit position of the destination register.

Figure 2:
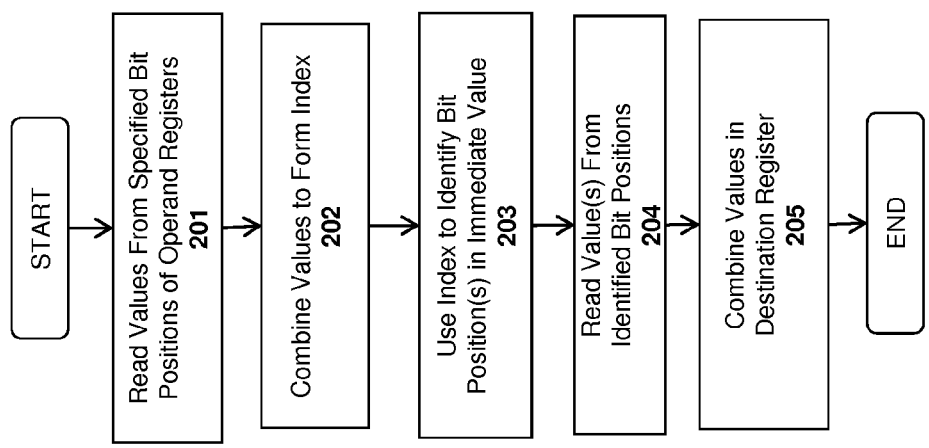
FIG. 2 illustrates one embodiment of a method for indexing an immediate value to perform logical operations.

A method according to one embodiment of the invention is illustrated in FIG. 2. At 201 values are read from the specified bit positions of the operand registers (e.g., dest, src1, src2). Multiple sets of values may be read concurrently from multiple index values in parallel. At 202, the values are combined to form an index to the immediate value and at 203 the index is used to identify bit position(s) within the immediate value. As mentioned above, in one embodiment, bits from corresponding bit positions in the source operands are concatenated to form the indices to the immediate value. At 204, the value(s) at the bit position(s) identified by the index values are read and, at 205, the values from the indexed bit positions are copied to the destination register.

Using the foregoing techniques, different immediate values may be specified to implement different logical operations. By way of example, and not limitation, the following types of operations may be performed using the following immediate values:

1. Set the result to all ones. Immediate value=11111111. In this example, any bits read from the immediate value will result in a binary 1 in the destination register.

2. Invert while copying. Immediate Value=01010101. Current NOT instructions (e.g., those implemented in the current x86 instruction set), invert in place, destroying the original data. By contrast, the techniques described above using the above immediate value copy to a different register. This instruction may take the form dest=NOT src1.

3. Emulating an existing logical operation. Immediate Value=10001000. This immediate value results in an AND operation of the values in source register 1 and source register 2, i.e., dest=src1 AND src2. Note that because bits 3-0 and bits 7-4 are identical, the value in the destination register (dest) does not affect the outcome. Consequently, in one embodiment, the destination register is not read to decrease power consumption.

The following table (Table A) illustrates imm8 values which are equivalent to existing x86 logical operations:

TABLE A

| Existing Operation | Immediate Value |
|---|---|
| dest = NOT src1 | 01010101 |
| dest = src1 OR src2 | 11101110 |
| dest = src1 AND src2 | 10001000 |
| dest = src1 ANDN src2 | 00100010 |
| dest = src1 XOR src2 | 01100110 |

4. Combining two existing logical operations. Immediate Value=01111000. This immediate value results in an AND of source register 1 and source register 2, with the result XORed with the value in the destination register. The instruction may take the form dest=(src1 AND src2) XOR dest As previously described, the only way to implement this operation using conventional techniques is to execute multiple different instructions consuming a significant amount of time and processing resources. By contrast, using the immediate value specified above may provide a result in the same amount of time as the other operations described herein.

5. Selection. Immediate Value=10101100. The purpose of this operation is to select source register 1 if the corresponding bit in the destination is set, otherwise select source register 2. Conventionally, this would require logic such as: dest= (src1 AND dest) OR (src2 AND (NOT dest)), which requires a significant number of instructions. By contrast, using the immediate value specified above will provide the result just as efficiently as the other immediate value operations specified herein.

6. Voting. Immediate Value=11101000. Using this operation, of the three inputs, choose the most popular value. For example, if a bit in the destination register is 0, the bit in source register 1 is 1, and the bit in source register 2 is 0, then 0 is the most popular output. Consequently, a 0 is selected and stored in the destination register.

It should be noted that the foregoing operations are merely provided for the purpose of illustration. The underlying principles of the invention are not limited to any particular set of operations. A virtually unlimited number of logical operations may be implemented using different immediate values in accordance with the underlying principles of the invention (although with an 8-bit immediate value, only 256 logical operations are possible).

The following pseudo-code represents one embodiment of the invention when implemented in a processor pipeline having 64-bit operands and using an immediate value of imm8:

```
for (i = 0; i < 64; i++) {
    index = (dest[i]<<2) | (src2[i]<<1) | (src1[i]);
    dest[i] = imm8[index];
}
```

In this implementation, an index value is calculated by concatenating each of the bit values from the destination register (dest), source register 1 (src1) and source register 2 (src2) at bit positions i (between 0 and 63). The effect of the <<2 and <<1 operations is to shift the bits to the left by two and one, respectively, thereby aligning the bits to properly form the index. For example, if the bit value from each of the operands is 1, then the result of dest [i]<<2 is 100, the result of src2 [i]<<1 is 010 and the result of src1 [i] is 001. A bitwise OR operation is then performed on the results (as indicated by the|operator). The end result is an index value identifying a particular bit within imm8. Note that the outer for( ) loop is for pseudo-code illustration purposes only; in one embodiment all 64 operations are performed in parallel in separate copies of the hardware.

The following pseudo-code represents another embodiment of the invention when implemented in a processor pipeline utilizing 512-bit registers each storing 16 32-bit packed data elements, and an immediate value of imm8:

```
for (n = 0; n < 16; n++) {
    if(mask[n] != 0) {
        for (j = 0; j < 32; j++) {
            i = 32*n + j;
            index = (dest[i]<<2) | (src2[i]<<1) | (src1[i]);
            dest[i] = imm8[index];
        }
    }
}
```

In this embodiment, a mask register is used which stores a bit associated with each of the 16 32-bit packed data elements. The mask[n] !=0 test indicates that if a mask bit a associated with a data element is equal to zero, then the current value stored in the destination register (dest) for that data element is to remain unchanged. If, however, the mask bit is non-zero, then the next FOR loop is performed, resulting in index values being calculated for that data element (as described above). Again, the for( ) loops are illustrational; in one embodiment all 512 operations are performed in parallel.

While the embodiments of the invention described above work from three source operands, the underlying principles of the invention may be implemented using any number of operands. For example, the following pseudo-code illustrates how four operands (three sources and the destination) may be used to generate an index value into a 16-bit immediate value (imm16):

```
for (n = 0; n < 16; n++) {
    for (j = 0; j < 32; j++) {
        i = 32*n + j;
```

```
        index = (dest[i]<<3) | (src3[i]<<2)
              | (src2[i]<<1) | (src1[i]);
        dest[i] = imm16[index];
    }
}
```

Alternatively, one of the sources may come from a mask register:

```
for (n = 0; n < 16; n++) {
    for (j = 0; j < 32; j++) {
        i = 32*n + j;
        index = (mask[n]<<3) | (dest[i]<<2)
              | (src2[i]<<1) | (src1[i]);
        dest[i] = imm16[index];
    }
}
```

As indicated in the code above, in this embodiment, the fourth operand may be stored in the mask register. The index value is generated by performing a bitwise OR on corresponding bits from the mask register (shifted left by 3); the destination register (shifted left by 2); source register 2 (shifted left by 1) and source register 1. The resulting 4-bit value is then used as a lookup to the 16-bit immediate value imm16.

An Exemplary Processor Architecture

Figure 3:
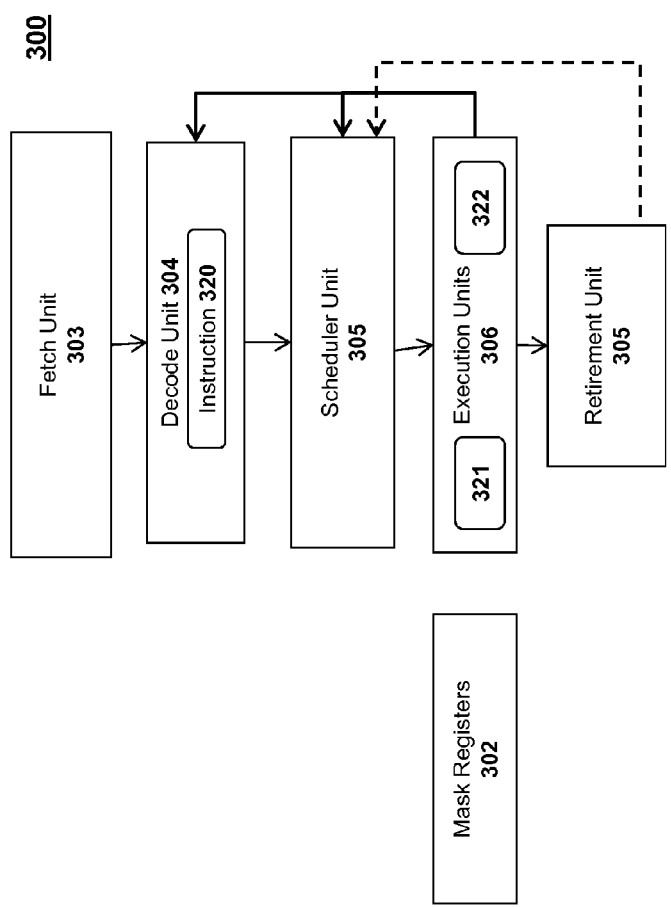
FIG. 3 illustrates an exemplary processing core upon which embodiments of the invention may be implemented.

FIG. 3 illustrates an exemplary processing core 300 upon which embodiments of the invention may be implemented. The generic processing core 300 is believed to describe many different types of processing core architectures such as Complex Instruction Set (CISC), Reduced Instruction Set (RISC) and Very Long Instruction Word (VLIW). The generic processing core 300 of Figure includes: 1) a fetch unit 303 that fetches instructions (e.g., from cache and/or memory); 2) a decode unit 304 that decodes instructions (e.g., instruction 320); 3) a schedule unit 305 that determines the timing and/or order of instruction issuance to the execution units 306 (notably the scheduler is optional); 4) execution units 306 that execute the instructions such as instructions 321 and 322 (typical instruction execution units include branch execution units, integer arithmetic execution units (e.g., ALUs), floating point arithmetic execution units (e.g., FPUs) and memory access execution units); and 5) a retirement unit 305 that signifies successful completion of an instruction. Notably, the processing core 300 may or may not employ microcode (not shown). Mask registers 302 may be utilized in accordance with embodiments of the invention as described above.

An Exemplary Computer System

The following are exemplary systems suitable for executing the instruction(s) detailed herein. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
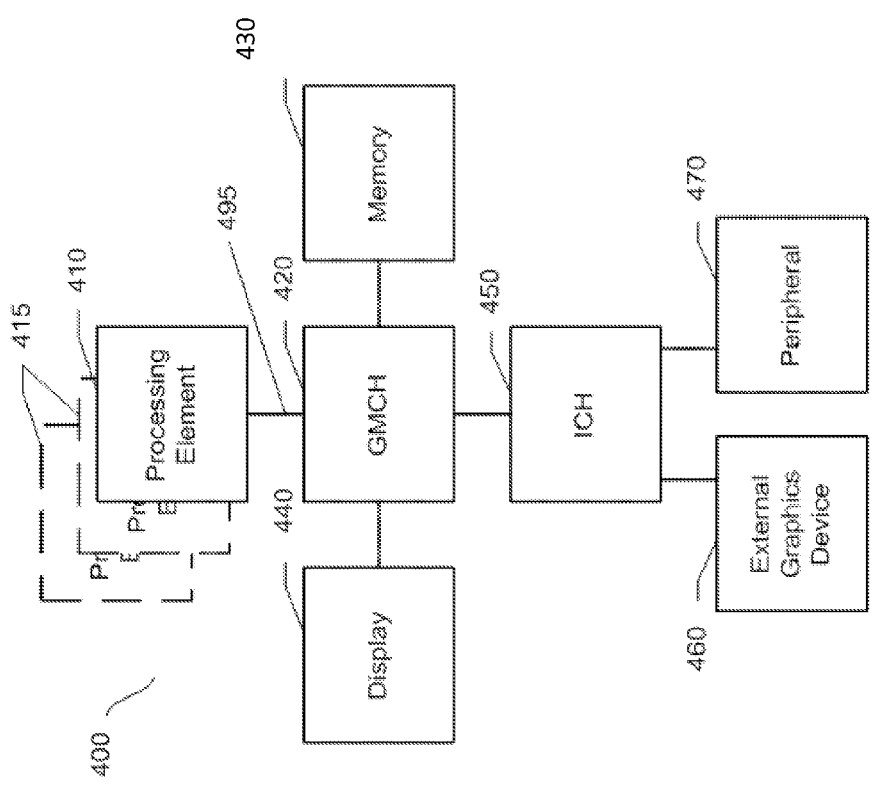
FIG. 4 illustrates a processor architecture employed in one embodiment of the invention.

Referring now to FIG. 4, shown is a block diagram of a system 400 in accordance with one embodiment of the present invention. The system 400 may include one or more processing elements 410, 415, which are coupled to graphics memory controller hub (GMCH) 420. The optional nature of additional processing elements 415 is denoted in FIG. 4 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multi-threaded in that they may include more than one hardware thread context per core.

FIG. 4 illustrates that the GMCH 420 may be coupled to a memory 430 that may be, for example, a dynamic random access memory (DRAM). The DRAM may, for at least one embodiment, be associated with a non-volatile cache.

The GMCH 420 may be a chipset, or a portion of a chipset. The GMCH 420 may communicate with the processor(s) 410, 415 and control interaction between the processor(s) 410, 415 and memory 430. The GMCH 420 may also act as an accelerated bus interface between the processor(s) 410, 415 and other elements of the system 400. For at least one embodiment, the GMCH 420 communicates with the processor(s) 410, 415 via a multi-drop bus, such as a frontside bus (FSB) 495.

Furthermore, GMCH 420 is coupled to a display 440 (such as a flat panel display). GMCH 420 may include an integrated graphics accelerator. GMCH 420 is further coupled to an input/output (I/O) controller hub (ICH) 450, which may be used to couple various peripheral devices to system 400. Shown for example in the embodiment of FIG. 4 is an external graphics device 460, which may be a discrete graphics device coupled to ICH 450, along with another peripheral device 470.

Alternatively, additional or different processing elements may also be present in the system 400. For example, additional processing element(s) 415 may include additional processors(s) that are the same as processor 410, additional processor(s) that are heterogeneous or asymmetric to processor 410, accelerators (such as, e.g., graphics accelerators or digital signal processing (DSP) units), field programmable gate arrays, or any other processing element. There can be a variety of differences between the physical resources 410, 415 in terms of a spectrum of metrics of merit including architectural, microarchitectural, thermal, power consumption characteristics, and the like. These differences may effectively manifest themselves as asymmetry and heterogeneity amongst the processing elements 410, 415. For at least one embodiment, the various processing elements 410, 415 may reside in the same die package.

Figure 5:
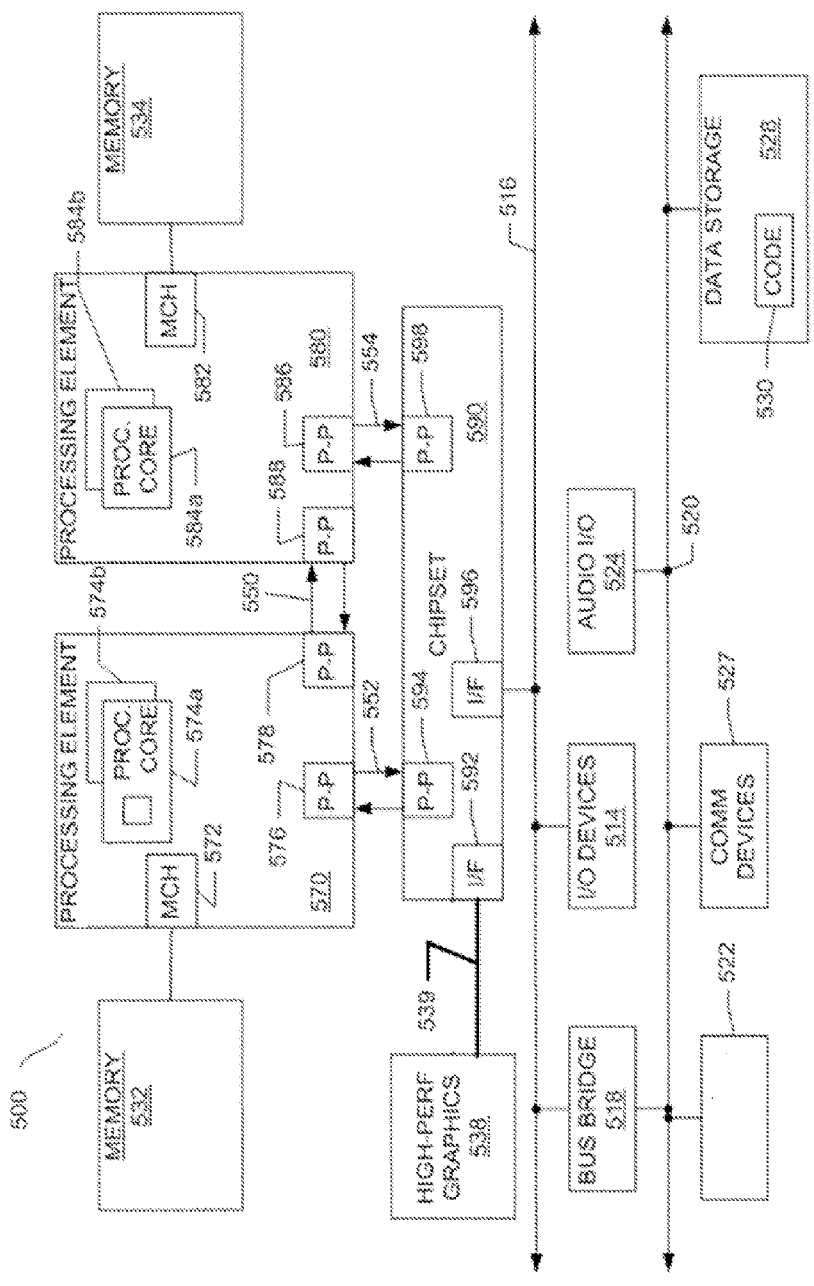
FIG. 5 illustrates a system architecture employed in one embodiment of the invention.

Referring now to FIG. 5, shown is a block diagram of a second system 500 in accordance with an embodiment of the present invention. As shown in FIG. 5, multiprocessor system 500 is a point-to-point interconnect system, and includes a first processing element 570 and a second processing element 580 coupled via a point-to-point interconnect 550. As shown in FIG. 5, each of processing elements 570 and 580 may be multicore processors, including first and second processor cores (i.e., processor cores 574a and 574b and processor cores 584a and 584b).

Alternatively, one or more of processing elements 570, 580 may be an element other than a processor, such as an accelerator or a field programmable gate array.

While shown with only two processing elements 570, 580, it is to be understood that the scope of the present invention is not so limited. In other embodiments, one or more additional processing elements may be present in a given processor.

First processing element 570 may further include a memory controller hub (MCH) 572 and point-to-point (P-P) interfaces 576 and 578. Similarly, second processing element 580 may include a MCH 582 and P-P interfaces 586 and 588. Processors 570, 580 may exchange data via a point-to-point interface 550 using PtP interface circuits 578, 588. As shown in FIG. 5, MCHs 572 and 582 couple the processors to respective memories, namely a memory 532 and a memory 534, which may be portions of main memory locally attached to the respective processors.

Processors 570, 580 may each exchange data with a chipset 590 via individual P-P interfaces 552, 554 using point to point interface circuits 576, 594, 586, 598. Chipset 590 may also exchange data with a high-performance graphics circuit 538 via a high-performance graphics interface 539. Embodiments of the invention may be located within any processor having any number of processing cores, or within each of the P-P bus agents of FIG. 5. In one embodiment, any processor core may include or otherwise be associated with a local cache memory (not shown). Furthermore, a shared cache (not shown) may be included in either processor outside of both processors, yet connected with the processors via P-P interconnect, such that either or both processors' local cache information may be stored in the shared cache if a processor is placed into a low power mode.

First processing element 570 and second processing element 580 may be coupled to a chipset 590 via P-P interconnects 576, 594, 586, and 598, respectively. As shown in FIG. 5, chipset 590 includes P-P interfaces 594 and 598. Furthermore, chipset 590 includes an interface 592 to couple chipset 590 with a high performance graphics engine 538. In one embodiment, bus 539 may be used to couple graphics engine 538 to chipset 590. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 527 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 5, a system may implement a multi-drop bus or other such architecture.

Figure 6:
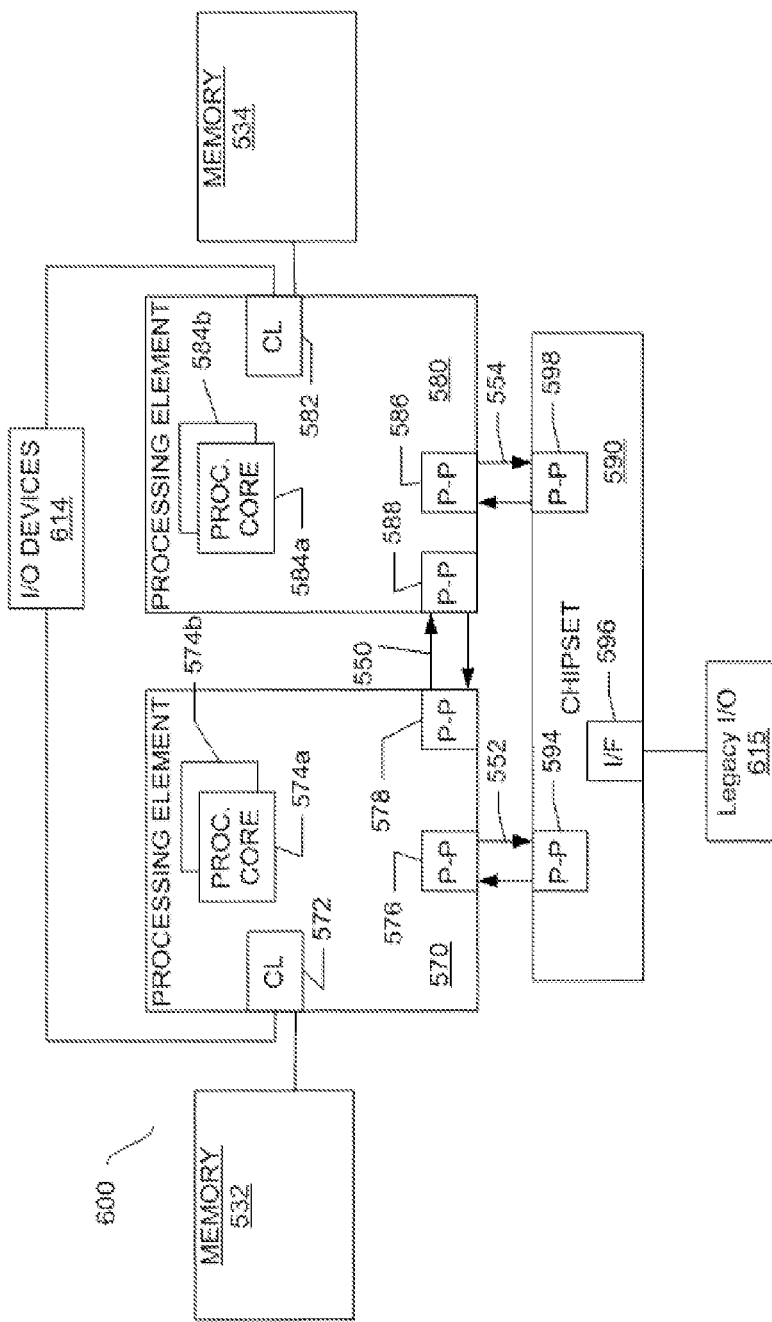
FIG. 6 illustrates a plurality of processing elements in accordance with one embodiment of the invention.

Referring now to FIG. 6, shown is a block diagram of a third system 600 in accordance with an embodiment of the present invention. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processing elements 570, 580 may include integrated memory and I/O control logic ("CL") 572 and 582, respectively. For at least one embodiment, the CL 572, 582 may include memory controller hub logic (MCH) such as that described above in connection with FIGS. 4 and 5. In addition, CL 572, 582 may also include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Embodiments of the mechanisms disclosed herein may be implemented in hardware, software, firmware, or a combination of such implementation approaches. Embodiments of the invention may be implemented as computer programs or program code executing on programmable systems comprising at least one processor, a data storage system (including volatile and non-volatile memory and/or storage elements), at least one input device, and at least one output device.

Program code, such as code 530 illustrated in FIG. 5, may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of particles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions for performing the operations embodiments of the invention or containing design data, such as HDL, which defines structures, circuits, apparatuses, processors and/or system features described herein. Such embodiments may also be referred to as program products.

Certain operations of the instruction(s) disclosed herein may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more of the systems of FIGS. 4, 5, and 6 and embodiments of the instruction(s) may be stored in program code to be executed in the systems. Additionally, the processing elements of these figures may utilize one of the detailed pipelines and/or architectures (e.g., the in-order and out-of-order architectures) detailed herein. For example, the decode unit of the in-order architecture may decode the instruction(s), pass the decoded instruction to a vector or scalar unit, etc.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method for performing a logical operation on a computer processor comprising:
    reading data from each of two or more source operands;
    for each bit position of the two or more source operands:
        combining a corresponding bit read from each of the two or more source operands with a corresponding bit read from each of the other source operands of the two or more source operands to generate an index value, the index value identifying a single bit within an immediate value associated with an instruction;
        reading the single bit identified by the index value from the immediate value; and
    storing each single bit read from the immediate value within a destination register to generate a result of the instruction.

2. The method as in claim 1 wherein combining a corresponding bit read from each of the two or more source operands with a corresponding bit read from each of the other source operands of the two or more source operands to generate an index value comprises:
    concatenating corresponding bits read from each source operand to generate the index value, the index value comprised of a set of concatenated corresponding bits identifying a bit position within the immediate value.

3. The method as in claim 2 further comprising:
    reading the single bit from the identified bit position of the immediate value and storing a resulting bit value in the destination register at a bit position corresponding to the bit position of the corresponding bits read from each source operand.

4. The method as in claim 2 wherein the two or more source operands are stored in N bit source registers and the destination register is an N bit destination register, wherein N is a positive integer, wherein concatenating corresponding bits read from each source operand to generate the index value is performed in parallel for all N bit positions of the two or more source operands, resulting in N indices to the immediate value, and wherein the N indices identify N bit positions in the immediate value, and wherein all N indexed bits from the immediate value are copied to the destination register in parallel to form the result of the instruction.

5. The method as in claim 4 wherein N is equal to 64.

6. The method as in claim 1 wherein the two or more source operands comprise three source operands and wherein the immediate value is eight bits, the method further comprising:
    concatenating corresponding bits read from each of the three source operands to generate the index value, the index value comprised of a set of three concatenated corresponding bits identifying a bit position within the eight bit immediate value.

7. The method as in claim 1 wherein the immediate value is an 8-bit value transmitted with the instruction.

8. The method as in claim 7 wherein the 8-bit value is an imm8 value.

9. The method as in claim 1 wherein the immediate value is a 16-bit value transmitted with the instruction.

10. An apparatus for processing instructions comprising:
    a decoder unit to decode an instruction and identify a logical operation to be performed by the instruction; and
    a hardware execution unit to execute the logical operation by performing the operations of:
    reading data from each of two or more source operands;
    for each bit position of the two or more source operands:
        combining a corresponding bit read from each of the two or more source operands with a corresponding bit read from each of the other source operands of the two or more source operands to generate an index value, the index value identifying a single bit within an immediate value associated with an instruction;
        reading the single bit identified by the index value from the immediate value; and
    storing each single bit read from the immediate value within a destination register to generate a result of the instruction.

11. The apparatus as in claim 10 wherein combining a corresponding bit read from each of the two or more source operands with a corresponding bit read from each of the other source operands of the two or more source operands to generate an index value comprises:
    concatenating corresponding bits read from each source operand to generate the index value, the index value comprised of a set of concatenated corresponding bits identifying a bit position within the immediate value.

12. The apparatus as in claim 11 wherein the execution unit performs the additional operations of:
    reading the single bit from the identified bit position of the immediate value and storing a resulting bit value in the destination register at a bit position corresponding to the bit position of the corresponding bits read from each source operand.

13. The apparatus as in claim 11 wherein the two or more source operands are stored in N bit source registers and the destination register is an N bit destination register, wherein N is a positive integer, wherein concatenating corresponding bits read from each source operand to generate the index value is performed in parallel for all N bit positions of the two or more source operands, resulting in N indices to the immediate value, and wherein the N indices identify N bit positions in the immediate value, and wherein all N indexed bits from the immediate value are copied to the destination register in parallel to form the result of the instruction.

14. The apparatus as in claim 13 wherein N is equal to 64.

15. The apparatus as in claim 10 wherein the two or more source operands comprise three source operands and wherein the immediate value is eight bits, the operations further comprising:
    concatenating corresponding bits read from each of the three source operands to generate the index value, the index value comprised of a set of three concatenated corresponding bits identifying a bit position within the eight bit immediate value.

16. The apparatus as in claim 10 wherein the immediate value is an 8-bit value transmitted with the instruction.

17. The apparatus as in claim 16 wherein the 8-bit value is an imm8 value.

18. The apparatus as in claim 10 wherein the immediate value is a 16-bit value transmitted with the instruction.

19. A computer system comprising:
a display device;
a memory for storing instructions;
a processor for processing the instructions comprising:
  a decoder unit to decode an instruction and identify a logical operation to be performed by the instruction; and
  hardware execution unit to execute the logical operation by performing the operations of:
  reading data from each of two or more source operands;
  for each bit position of the two or more source operands:
    combining a corresponding bit read from each of the two or more source operands with a corresponding bit read from each of the other source operands of the two or more source operands to generate an index value, the index value identifying a single bit within an immediate value associated with an instruction;
    reading the single bit identified by the index value from the immediate value; and
    storing each single bit read from the immediate value within a destination register to generate a result of the instruction.

20. The system as in claim 19 wherein combining a corresponding bit read from each of the two or more source operands with a corresponding bit read from each of the other source operands of the two or more source operands to generate an index value comprises:
  concatenating corresponding bits read from each source operand to generate the index value, the index value comprised of a set of concatenated corresponding bits identifying a bit position within the immediate value.

21. The system as in claim 20 wherein the execution unit performs the additional operations of:
  reading the single bit from the identified bit position of the immediate value and storing a resulting bit value in the destination register at a bit position corresponding to the bit position of the corresponding bits read from each source operand.

22. The system as in claim 20 wherein the two or more source operands are stored in N bit source registers and the destination register is an N bit destination register, wherein N is a positive integer, wherein concatenating corresponding bits read from each source operand to generate the index value is performed in parallel for all N bit positions of the two or more source operands, resulting in N indices to the immediate value, and wherein the N indices identify N bit positions in the immediate value, and wherein all N indexed bits from the immediate value are copied to the destination register in parallel to form the result of the instruction.

23. The system as in claim 22 wherein N is equal to 64.

24. The system as in claim 19 wherein the two or more source operands comprise three source operands and wherein the immediate value is eight bits, the operations further comprising:
  concatenating corresponding bits read from each of the three source operands to generate the index value, the index value comprised of a set of three concatenated corresponding bits identifying a bit position within the eight bit immediate value.

25. The system as in claim 19 wherein the immediate value is an 8-bit value transmitted with the instruction.

26. The system as in claim 25 wherein the 8-bit value is an imm8 value.

27. The system as in claim 19 wherein the immediate value is a 16-bit value transmitted with the instruction.

\* \* \* \* \*

UNITED STATES PATENT AND TRADEMARK OFFICE
CERTIFICATE OF CORRECTION

| | | |
|---|---|---|
| PATENT NO. | : 8,539,206 B2 | Page 1 of 1 |
| APPLICATION NO. | : 12/890571 | |
| DATED | : September 17, 2013 | |
| INVENTOR(S) | : Forsyth | |

It is certified that error appears in the above-identified patent and that said Letters Patent is hereby corrected as shown below:

In the Specification:

In column 4, at line 46 delete, "bit a" and insert --bit--.

In the Claims:

In column 10, at line 54 delete, "from each" and insert --from of each--.

Signed and Sealed this
Twenty-ninth Day of April, 2014

Michelle K. Lee
*Deputy Director of the United States Patent and Trademark Office*